United States Patent
Wehrmann et al.

(10) Patent No.: US 10,934,415 B2
(45) Date of Patent: Mar. 2, 2021

(54) POLYCARBONATE COMPOSITIONS CONTAINING A CARBOXYLIC ACID AND THEIR GLYCEROL OR DIGLYCEROL ESTERS

(71) Applicant: Covestro Deutschland AG, Leverkusen (DE)

(72) Inventors: Rolf Wehrmann, Krefeld (DE); Helmut Werner Heuer, Leverkusen (DE); Anke Boumans, Goch (DE)

(73) Assignee: Covestro Deutschland AG, Leverkusen (DE)

(*) Notice: Subject to any disclaimer, the term of this patent is extended or adjusted under 35 U.S.C. 154(b) by 19 days.

(21) Appl. No.: 16/302,762

(22) PCT Filed: May 22, 2017

(86) PCT No.: PCT/EP2017/062224
§ 371 (c)(1),
(2) Date: Nov. 19, 2018

(87) PCT Pub. No.: WO2017/202751
PCT Pub. Date: Nov. 30, 2017

(65) Prior Publication Data
US 2019/0153199 A1 May 23, 2019

(30) Foreign Application Priority Data
May 24, 2016 (EP) ..................................... 16171097

(51) Int. Cl.
| | | |
|---|---|---|
| C08K 5/103 | (2006.01) | |
| C08K 5/09 | (2006.01) | |
| C08K 7/14 | (2006.01) | |
| C08L 69/00 | (2006.01) | |
| C08K 3/04 | (2006.01) | |
| C08K 7/06 | (2006.01) | |
| C08K 5/521 | (2006.01) | |

(52) U.S. Cl.
CPC ................. *C08K 7/14* (2013.01); *C08K 3/04* (2013.01); *C08K 5/09* (2013.01); *C08K 5/103* (2013.01); *C08K 5/521* (2013.01); *C08K 7/06* (2013.01)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,365 A | 4/1962 | Schnell et al. |
| 3,148,172 A | 9/1964 | Fox |
| 3,271,367 A | 9/1966 | Schnell et al. |
| 3,784,595 A * | 1/1974 | Schirmer .................. C08J 3/22 524/315 |
| 3,879,348 A | 4/1975 | Serini et al. |
| 3,951,903 A | 4/1976 | Shaffer |
| 4,420,584 A | 12/1983 | Rawlings et al. |
| 4,762,896 A * | 8/1988 | Fox .......................... C08K 5/09 524/300 |
| 4,982,014 A | 1/1991 | Freitag et al. |
| 5,132,154 A | 7/1992 | Westeppe et al. |
| 5,288,778 A | 2/1994 | Schmitter et al. |
| 5,821,380 A | 10/1998 | Holderbaum et al. |
| 5,883,165 A | 3/1999 | Kröhnke et al. |
| 8,916,630 B2 | 12/2014 | Dern et al. |
| 2015/0086856 A1* | 3/2015 | Tomita .................... C08L 69/00 429/176 |
| 2015/0368434 A1* | 12/2015 | Meyer ....................... C08K 5/08 428/412 |

FOREIGN PATENT DOCUMENTS

| | | |
|---|---|---|
| CN | 104629284 * | 5/2015 |
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 3918406 A1 | 12/1990 |
| EP | 0063769 A2 | 11/1982 |
| EP | 0500496 A1 | 8/1992 |

(Continued)

OTHER PUBLICATIONS

Angelov, SAXS Invesigation of a Cubic to a Sponge (L3) Phase Transition in Self-Assembled Lipid Nanocarriers, Physical Chemistry Chemical Physics (2011) No. 13 pp. 3073-3081. (Year: 2011).*

(Continued)

*Primary Examiner* — David J Buttner
(74) *Attorney, Agent, or Firm* — Faegre Drinker Biddle & Reath LLP

(57) ABSTRACT

The invention relates to glass-fibre- and/or carbon-fibre-reinforced polycarbonate compositions having improved flowability coupled with good heat resistance and to articles of manufacture produced from said compositions, in particular those from the thin wall applications sector, for example housing parts for ultrabooks or smartphones. The compositions comprise at least one saturated or unsaturated monocarboxylic acid having a chain length of 6 to 30 carbon atoms and at least one ester of these monocarboxylic acids based on glycerol and/or diglycerol.

13 Claims, No Drawings

(56) References Cited

FOREIGN PATENT DOCUMENTS

| | | |
|---|---|---|
| EP | 0839623 A1 | 5/1998 |
| EP | 2664652 A1 | 11/2013 |
| EP | 2955201 A1 | 12/2015 |
| FR | 1561518 A | 3/1969 |
| GB | 1122003 A | 7/1968 |
| GB | 1229482 A | 4/1971 |
| GB | 1367790 A | 9/1974 |
| JP | S6162039 A | 3/1986 |
| JP | S6162040 A | 3/1986 |
| JP | S61105550 A | 5/1986 |
| JP | 2011256359 A | 12/2011 |
| WO | WO-9615102 A2 | 5/1996 |
| WO | WO-2013045552 A1 | 4/2013 |

OTHER PUBLICATIONS

International Search Report for PCT/EP2017/062224 dated Aug. 8, 2017.

* cited by examiner

POLYCARBONATE COMPOSITIONS CONTAINING A CARBOXYLIC ACID AND THEIR GLYCEROL OR DIGLYCEROL ESTERS

CROSS-REFERENCE TO RELATED APPLICATIONS

This application is a national stage application (under 35 U.S.C. § 371) of PCT/EP2017/062224, filed May 22, 2017, which claims benefit of European Application No. 16171097.5, filed May 24, 2016, both of which are incorporated herein by reference in their entirety.

The present invention relates to both glass-fibre- and carbon-fibre-reinforced poly-carbonate-containing compositions having high flowability, exceptional stiffness and good flame retardancy properties. The present invention further relates to the use of the compositions according to the invention for producing housing parts in the electricals and electronics and IT sectors, for example for electrical housings/switch boxes or for frames of LCD/LED screens and also for housing parts of mobile communication terminals, such as smartphones, tablets, ultrabooks, notebooks or laptops, but also satnavs, smartwatches or heart rate monitors, and also electrical applications in thin wall installations, for example residential and industrial networking units and smart meter housing components, and to corresponding mouldings.

BACKGROUND OF THE INVENTION

It is known from the prior art to add to plastics such as polycarbonate glass fibres or carbon fibres which improve stiffness. There are also a great many flame retardants known which are suitable for polycarbonate. However, optimization of the properties of a polycarbonate in terms of stiffness and flame retardancy properties is simultaneously associated with a deterioration in flowability which is problematic particularly having regard to thin wall applications.

WO 2013/045552 A1 describes glass-fibre-filled flame retarded polycarbonates having a high degree of stiffness coupled with good toughness. It teaches nothing about the possibility of improving flowability of corresponding compositions. Also, U.S. Pat. No. 3,951,903 A describes the use of carboxylic anhydrides in glass-fibre-filled polycarbonates for improving stress cracking resistance. EP 0 063 769 A2 describes a polycarbonate comprising glass fibres and polyanhydride and exhibiting improved impact strength. An improvement in flowability is not described.

Conventionally, BDP (bisphenol A diphosphate) is used for flow improvement, namely in amounts of up to more than 10 wt % to achieve the desired effect. However, this markedly reduces heat resistance.

BRIEF SUMMARY OF THE INVENTION

It was an object of the present invention to provide reinforced polycarbonate-containing compositions having a combination of high stiffness, high flowability and ideally a flame resistance of UL94 V-0 for mouldings produced with a wall thickness of 1.5 mm and corresponding mouldings.

It has been found that, surprisingly, glass-fibre- and/or carbon-fibre-containing compositions based on polycarbonate exhibit improved flowability when certain amounts of monocarboxylic acids and glycerol and/or diglycerol esters thereof are present, wherein heat resistance, determined on the basis of the Vicat temperature, remains virtually unchanged.

The polycarbonate compositions comprising the carboxylic acids and glycerol and/or diglycerol esters thereof preferably show good melt stabilities with improved rheological properties, namely a higher melt volume flow rate (MVR) determined to DIN EN ISO 1133:2012-03 (at a test temperature of 300° C., mass 1.2 kg) and an improved melt viscosity, determined to ISO 11443:2005. The compositions preferably continue to feature good mechanical properties, measurable for example via notched impact strength determined to ISO 7391-2:2006 or via impact strength determined to ISO 7391-2:2006.

DETAILED DESCRIPTION OF THE INVENTION

The present invention thus provides compositions comprising
A) 20.0 wt % to 99.45 wt % of aromatic polycarbonate,
B) 0.50 to 50.0 wt % of glass fibres or carbon fibres,
C) 0.05 wt % to 10.0 wt % of a mixture comprising at least one saturated or unsaturated monocarboxylic acid having a chain length of 6 to 30 carbon atoms and at least one ester of this monocarboxylic acid based on glycerol and/or diglycerol.

The compositions preferably comprise
A) 20.0 wt % to 99.45 wt %, more preferably 70.0 wt % to 94.0 wt %, yet more preferably 79.0 to 89.5 wt %, of aromatic polycarbonate,
B) 0.50 to 50.0 wt %, more preferably 5 to 25 wt %, yet more preferably 10 to 20 wt %, of glass fibres or carbon fibres, particularly preferably glass fibres,
C) 0.05 wt % to 10.0 wt %, more preferably 0.1 to 8.0 wt %, yet more preferably 0.2 to 6.0 wt %, in particular 0.2 to 1.0 wt %, of the mixture comprising at least one saturated or unsaturated monocarboxylic acid having a chain length of 6 to 30 carbon atoms and at least one ester of the monocarboxylic acid based on glycerol and/or digycerol,
D) 0.0 wt % to 1.0 wt %, more preferably 0.005 to 0.5 wt %, yet more preferably 0.01 to 0.2 wt %, of heat stabilizer and
E) 0.0 wt % to 10.0 wt %, more preferably 0.1 to 3 wt %, yet more preferably 0.2 to 1.0 wt %, of further additives.

It is particularly preferable when the compositions comprise
A) 79 wt % to 90 wt %, preferably up to 89.5 wt %, of aromatic polycarbonate,
B) 8.5 to 20.5 wt %, preferably 10 to 20 wt %, of glass fibres or carbon fibres, particularly preferably glass fibres,
C) 0.2 to 1.0 wt %, preferably up to 0.6 wt %, of the mixture comprising at least one saturated or unsaturated monocarboxylic acid having a chain length of 6 to 30 carbon atoms and at least one ester of the monocarboxylic acid based on glycerol and/or diglycerol,
D) 0.005 to 0.5, preferably 0.01 to 0.2 wt %, of heat stabilizer and
E) 0.1 wt % to 3 wt %, preferably 0.2 to 1.0 wt %, very particularly preferably up to 0.5 wt %, of further additives.

It is very particularly preferable when the above-described compositions comprise no further components but rather the amounts of components A), B), C) and optionally D) and/or E) sum to 100 wt %.

The above-described preferred embodiments of compositions according to the invention very particularly preferably comprise as component C more than 50 wt % of oleic esters of glycerol and/or diglycerol based on the total weight of the mixture C and less than 3 wt % of free carboxylic acids based on the total weight of mixture C, wherein oleic acid preferably makes up the largest proportion of free carboxylic acids.

$C_1$- to $C_4$-alkyl in the following description of the invention represents in the context of the invention for example methyl, ethyl, n-propyl, isopropyl, n-butyl, sec-butyl, tert-butyl, and $C_1$ to $C_6$-alkyl furthermore represents for example n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,3-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl. $C_1$- to $C_{10}$-alkyl furthermore represents for example n-heptyl and n-octyl, pinacyl, adamantyl, the isomeric menthyls, n-nonyl, n-decyl. $C_1$- to $C_{34}$-alkyl furthermore represents for example n-dodecyl, n-tridecyl, n-tetradecyl, n-hexadecyl or n-octadecyl. The same applies for the corresponding alkyl radical for example in aralkyl/alkylaryl, alkylphenyl or alkylcarbonyl radicals. Alkylene radicals in the corresponding hydroxyalkyl or aralkyl/alkylaryl radicals represent for example the alkylene radicals corresponding to the preceding alkyl radicals.

Aryl represents a carbocyclic aromatic radical having 6 to 34 skeletal carbon atoms. The same applies for the aromatic part of an arylalkyl radical, also known as an aralkyl radical, and for aryl constituents of more complex groups, for example arylcarbonyl radicals.

Examples of $C_6$- to $C_{34}$-aryl are phenyl, o-, p-, m-tolyl, naphthyl, phenanthrenyl, anthracenyl and fluorenyl.

Arylalkyl and aralkyl each independently represent a straight-chain, cyclic, branched or unbranched alkyl radical as defined above which may be mono-, poly- or persubstituted by aryl radicals as defined above.

In the context of the present invention—unless explicitly stated otherwise—the stated wt % values for components A, B, C and optionally D and/or E are each based on the total weight of the composition. In addition to components A, B, C and D the composition may comprise further components, for instance further additives in the form of component E. The composition may likewise comprise one or more further thermoplastics. In a preferred embodiment the composition comprises no further components but rather components A) to D) sum to 100 wt %, i.e. the composition consists of components A, B, C and D.

The compositions according to the invention are preferably used for producing mouldings. The compositions preferably have a melt volume flow rate (MVR) of 2 to 120 cm$^3$/(10 min), more preferably of 3 to 90 cm$^3$/(10 min) determined to ISO 1133:2012-3 (test temperature 300° C., mass 1.2 kg).

The individual constituents of the compositions according to the invention are more particularly elucidated hereinbelow:

Component A

In the context of the invention the term "polycarbonate" is to be understood as meaning both homopolycarbonates and copolycarbonates. These polycarbonates may be linear or branched in known fashion. Mixtures of polycarbonates may also be used according to the invention.

Compositions according to the invention comprise as component A 20.0 wt % to 99.45 wt % of aromatic polycarbonate. The amount of the aromatic polycarbonate in the composition is preferably 70.0 to 94.0 wt %, more preferably 79 to 90 wt %, yet more preferably 79.0 to 89.5 wt %, wherein a single polycarbonate or a mixture of a plurality of polycarbonates may be present.

The thermoplastic polycarbonates have average molecular weights $M_w$, determined by gel permeation chromatography to DIN 55672-1:2007-08, calibrated against bisphenol A polycarbonate standards using dichloromethane as eluent, of 10 000 g/mol to 40 000 g/mol, preferably of 12 000 g/mol to 36 000 g/mol, in particular of 15 000 g/mol to 34 000 g/mol.

The reported values relate to a calibration with linear polycarbonates (composed of bisphenol A and phosgene) of known molar mass distribution (469 g/mol to about 100 000 g/mol) from PSS Polymer Standards Service GmbH, Germany. Method: 2301-0257502-09D (2009 German language version) from Currenta GmbH & Co. OHG, Leverkusen. Dichloromethane eluent. Gel permeation chromatography column combination: made of crosslinked styrene-divinylbenzene resins, five analytical columns having a diameter of 7.5 mm and a length of 300 mm. Particle sizes of column material in the range from 3 µm to 20 µm. Concentration of analysed solutions: 0.2 wt %. Flow rate: 1.0 ml/min, temperature of solutions: 30° C. Detection: using a refractive index (RI) detector.

The polycarbonates present in the compositions are produced in a known manner from diphenols, carbonic acid derivatives, optionally chain terminators and branching agents.

Particulars pertaining to the production of polycarbonates are disclosed in many patent documents spanning approximately the last 40 years. Reference is made here, for example, to Schnell, "Chemistry and Physics of Polycarbonates", Polymer Reviews, Volume 9, Interscience Publishers, New York, London, Sydney 1964, to D. Freitag, Grigo, P. R. Müller, H. Nouvertné, BAYER A G, "Polycarbonates" in Encyclopedia of Polymer Science and Engineering, Volume 11, Second Edition, 1988, pages 648-718, and finally to U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117 to 299.

Aromatic polycarbonates are produced for example by reaction of diphenols with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Production via a melt polymerization process by reaction of diphenols with for example diphenyl carbonate is likewise possible.

Diphenols suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl) sulphides, bis(hydroxyphenyl)ethers, bis(hydroxyphenyl) ketones, bis(hydroxyphenyl) sulphones, bis(hydroxyphenyl) sulphoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred diphenols are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl) propane, dimethylbisphenol A, bis(3,5-dimethyl-4- hydroxyphenyl)methane, 2,2-bis(3,5-dimethyl-4-hydroxyphenyppropane, bis(3,5-dimethyl-4-hydroxyphenyl) sulphone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane and also the bisphenols (I) to (III)

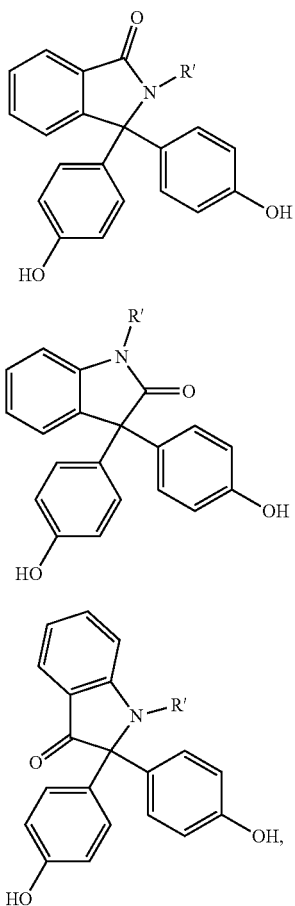

in which R' in each case represents $C_1$- to $C_4$-alkyl, aralkyl or aryl, preferably methyl or phenyl, very particularly preferably methyl.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A and also the diphenols of formulae (I), (II) and (III).

These and other suitable diphenols are described for example in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one diphenol is employed and in the case of copolycarbonates two or more diphenols are employed.

Suitable carbonic acid derivatives are for example phosgene and diphenyl carbonate.

Suitable chain terminators that may be employed in the production of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by tert-butyl. Particularly preferred chain terminators are phenol, cumylphenol and/or p-tert-butylphenol.

The amount of chain terminator to be employed is preferably 0.1 to 5 mol % based on the moles of diphenols employed in each case. The addition of the chain terminators may be carried out before, during or after the reaction with a carbonic acid derivative.

Suitable branching agents are the trifunctional or more than trifunctional compounds familiar in polyearbonate chemistry, in particular those having three or more than three phenolic OH groups.

Suitable branching agents are for example 1,3,5-tri(4-hydroxyphenyl)benzene, 1,1,1-tri(4-hydroxyphenypethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4"-dihydroxytriphenyl)methyl)benzene and 3,3-bis (3-methyl-4-hydroxyphenyl)-2-oxo-2,3-dihydroindole.

The amount of the branching agents for optional employment is preferably from 0.05 mol % to 2.00 mol % based on moles of diphenols used in each case.

The branching agents can either be initially charged with the diphenols and the chain terminators in the aqueous alkaline phase or added dissolved in an organic solvent before the phosgenation. In the case of the transesterification process the branching agents are employed together with the diphenols.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane and also homo- or copolycarbonates derived from the diphenols of formulae (I), (II) and (III)

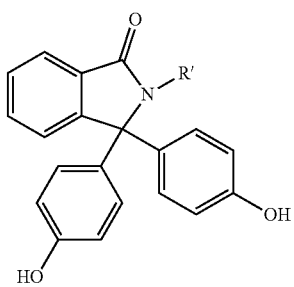

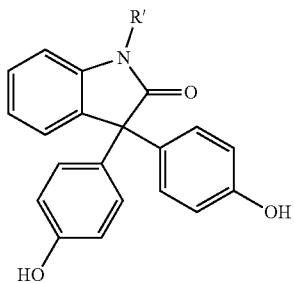

(II)

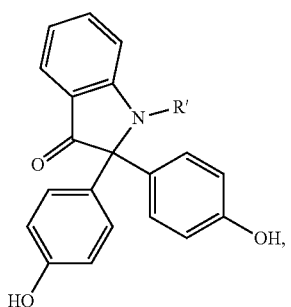

(III)

in which R' in each case represents $C_1$- to $C_4$-alkyl, aralkyl or aryl, preferably methyl or phenyl, very particularly preferably methyl.

To achieve incorporation of additives, component A is preferably employed in the form of powders, pellets or mixtures of powders and pellets.

The polycarbonate employed may also be a mixture of different polycarbonates, for example of polycarbonates A1 and A2:

The amount of the aromatic polycarbonate A1 based on the total amount of polycarbonate is from 25.0 to 85.0 wt %, preferably from 28.0 to 84.0 wt %, particularly preferably from 30.0 to 83.0 wt %, wherein this aromatic polycarbonate is based on bisphenol A with a preferred melt volume flow rate MVR of 5 to 25 cm³/(10 min), more preferably with a melt volume flow rate MVR of 6 to 22 cm³/(10 min) and particularly preferably with a melt volume flow rate-MVR of 6 to 20 cm³/(10 min), determined according to ISO 1133 (test temperature 300° C., mass 1.2 kg).

The amount of pulverulent aromatic polycarbonate A2 relative to the overall amount of polycarbonate is from 3.0 to 12.0 wt %, preferably from 4.0 to 11.0 wt % and more preferably from 4.0 to 10.0 wt %, and this aromatic polycarbonate is preferably based on bisphenol A with a preferred melt volume flow rate MVR of 3 to 8 cm³/(10 min), more preferably with a melt volume flow rate MVR of 4 to 7 cm³/(10 min) and yet more preferably with a melt volume flow rate MVR of 6 cm³/(10 min), determined according to ISO 1133 (test temperature 300° C., mass 1.2 kg).

In a preferred embodiment the composition comprises as component A a copolycarbonate comprising one or more monomer units of formula (1),

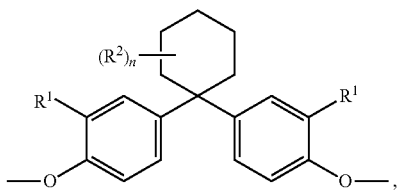

wherein
$R^1$ represents hydrogen or $C_1$- to $C_4$-alkyl radicals, preferably hydrogen,
$R^2$ represents $C_1$- to $C_4$-alkyl radicals, preferably a methyl radical,
n represents 0, 1, 2 or 3, preferably 3,
optionally in combination with a further aromatic homo- or copolycarbonate, comprising one or more monomer units of general formula (2),

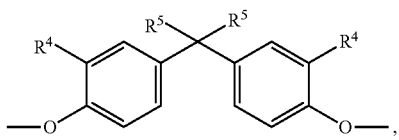

wherein
$R^4$ represents H, linear or branched $C_1$- to $C_{10}$-alkyl radicals, preferably linear or branched $C_1$- to $C_6$-alkyl radicals, particularly preferably linear or branched $C_1$- to $C_4$-alkyl radicals, very particularly preferably H or a $C_1$-alkyl radical (methyl radical), and
$R^5$ represents linear or branched $C_1$- to $C_{10}$-alkyl radicals, preferably linear or branched $C_1$- to $C_6$-alkyl radicals, particularly preferably linear or branched $C_1$- to $C_4$-alkyl radicals, very particularly preferably a $C_1$-alkyl radical (methyl radical);
and wherein the optionally also present further homo- or copolycarbonate comprises no monomer units of formula (1).

The monomer unit(s) of general formula (1) is/are introduced via one or more corresponding diphenols of general formula (1'):

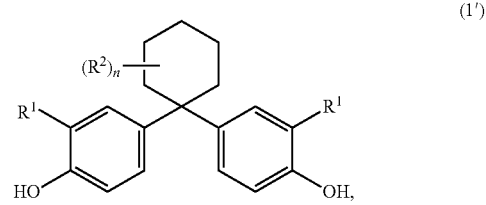

in which
$R^1$ represents hydrogen or a $C_1$- to $C_4$-alkyl radical, preferably hydrogen,
$R^2$ represents a $C_1$- to $C_4$-alkyl radical, preferably methyl radical, and
n represents 0, 1, 2 or 3, preferably 3.

The diphenols of formulae (1') and the employment thereof in homopolycarbonates are disclosed in DE 3918406 for example.

Particular preference is given to 1,1-bis-(4-hydroxyphenyl)-3,3,5-trimethylcyclohexane (bisphenol TMC) having the formula (1a):

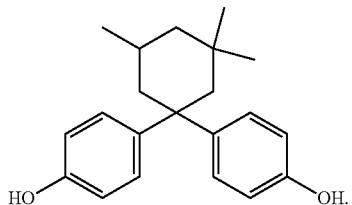

(1a)

In addition to one or more monomer units of formula (1) the copolycarbonate may comprise one or more monomer unit(s) of formula (3):

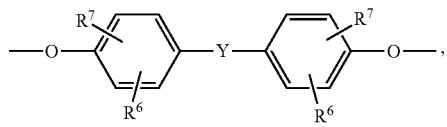

(3)

in which
$R^6$ and $R^7$ independently of one another represent H, $C_1$- to $C_{18}$-alkyl-, $C_1$- to $C_{18}$-alkoxy, halogen such as Cl or Br or respectively optionally substituted aryl or aralkyl, preferably H,
or $C_1$- to $C_{12}$-alkyl, particularly preferably H or $C_1$- to $C_8$-alkyl and very particularly preferably H or methyl, and
Y represents a single bond, —$SO_2$—, —CO—, —O—, —S—, $C_1$- to $C_6$-alkylene or $C_2$- to $C_5$-alkylidene, furthermore $C_6$- to $C_{12}$-arylene, which may optionally be fused with further heteroatom-comprising aromatic rings.

The monomer unit(s) of general formula (3) is/are introduced via one or more corresponding diphenols of general formula (3a):

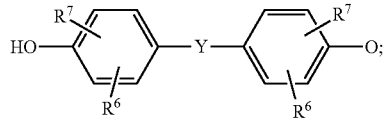

(3a)

wherein $R^6$, $R^7$ and Y each have the meaning stated above in connection with formula (3).

Particularly preferred diphenols of formula (3a) are diphenols of general formula (3b),

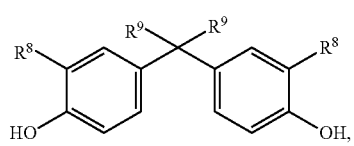

(3b)

in which $R^8$ represents H, linear or branched $C_1$- to $C_{10}$-alkyl radicals, preferably linear or branched $C_1$- to $C_6$-alkyl radicals, particularly preferably linear or branched $C_1$- to $C_4$-alkyl radicals, very particularly preferably H or a $C_1$-alkyl radical (methyl radical), and
in which $R^9$ represents linear or branched $C_1$- to $C_{10}$-alkyl radicals, preferably linear or branched $C_1$- to $C_6$-alkyl radicals, particularly preferably linear or branched $C_1$- to $C_4$-alkyl radicals, very particularly preferably a $C_1$-alkyl radical (methyl radical).

Diphenol (3c) in particular is very particularly preferred here.

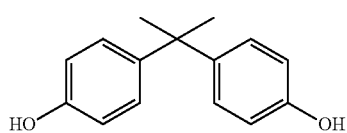

(3c)

The diphenols of general formulae (3a) may be used either alone or else in admixture with one another. The diphenols are known from the literature or producible by methods known from the literature (see for example H. J. Buysch et al., Ullmann's Encyclopedia of Industrial Chemistry, VCH, New York 1991, 5th Ed., Vol. 19, p. 348).

The total proportion of the monomer units of formula (1) in the copolycarbonate is preferably 0.1-88 mol %, particularly preferably 1-86 mol %, very particularly preferably 5-84 mol % and in particular 10-82 mol %·(sum of the moles of diphenols of formula (V) based on the sum of the moles of all diphenols employed).

Copolycarbonates may be present in the form of block or random copolycarbonates. Random copolycarbonates are particularly preferred. The ratio of the frequency of the diphenolate monomer units in the copolycarbonate is calculated from the molar ratio of the diphenols employed.

Monomer unit(s) of general formula (2) is/are introduced via a diphenol of general formula (2a):

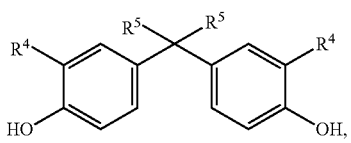

(2a)

in which $R^4$ represents H, linear or branched $C_1$- to $C_{10}$-alkyl radicals, preferably linear or branched $C_1$- to $C_6$-alkyl radicals, particularly preferably linear or branched $C_1$- to $C_4$-alkyl radicals, very particularly preferably H or a $C_1$-alkyl radical (methyl radical) and
in which $R^5$ represents linear or branched $C_1$- to $C_{10}$-alkyl radicals, preferably linear or branched $C_1$- to $C_6$-alkyl radicals, particularly preferably linear or branched $C_1$- to $C_4$-alkyl radicals, very particularly preferably a $C_1$-alkyl radical (methyl radical).

Bisphenol A is particularly preferred here.

In addition to one or more monomer units of general formulae (2) the optionally also present homo- or copolycarbonate may comprise one or more monomer units of formula (3) as previously described for the copolycarbonate.

Provided the composition according to the invention comprises copolycarbonate comprising monomer units of formula (1) the total amount of copolycarbonate comprising monomer units of formula (1) in the composition is preferably at least 3.0 wt %, particularly preferably at least 5.0 wt %.

In a preferred embodiment the composition according to the invention comprises as component A a blend of the copolycarbonate comprising the monomer units of formula (1) and a bisphenol-A-based homopolycarbonate.

Provided the composition according to the invention comprises copolycarbonate comprising monomer units of formula (1) the total proportion of monomer units of formula (1) in component A is preferably 0.1-88 mol %, particularly preferably 1-86 mol %, very particularly preferably 5-84 mol % and in particular 10-82 mol %, based on the sum of the moles of all monomer units of formulae (1) and (3) in the one or more polycarbonates of component A.

Component B

Compositions according to the invention comprise 0.50 to 50.0 wt %, in particular up to 45.0 wt %, preferably 1.0 to 35.0 wt %, more preferably 5 to 25 wt %, yet more preferably 8 to 22 wt %, particularly preferably 10 to 20 wt %, of glass fibres and/or carbon fibres.

Glass Fibres:

The glass fibres are based on a glass composition selected from the group of the M, E, A, S, R, AR, ECR, D, Q or C glasses, preference being given to E, S or C glass.

The glass fibres may be employed in the firm of endless fibres (rovings), chopped glass fibres, ground fibres, glass fibre fabrics or mixtures of the abovementioned forms, the use of chopped glass fibres and ground fibres being preferred.

Particular preference is given to employing chopped glass fibres.

The preferred fibre length of the chopped glass fibres before compounding is 0.5 to 10 mm, more preferably 1.0 to 8 mm, very particularly preferably 1.5 to 6 mm.

Chopped glass fibres may be employed with different cross sections. Preference is given to using round, elliptical, oval, figure-of-8 and flat cross sections, particular preference being given to round, oval and flat cross sections.

The diameter of round fibres employed is preferably 5 to 25 µm, more preferably 6 to 20 µm, particularly preferably 7 to 17 µm.

Glass fibres particularly preferred for compositions according to the invention are chopped glass fibres having a round cross section, a length of 4 mm to 5 mm, preferably up to 4.5 mm, and a fibre diameter of 10 to 15 µm.

Preferred flat and oval glass fibres have a height-to-width cross-sectional ratio of about 1.0:1.2 to 1.0:8.0, preferably 1.0:1.5 to 1.0:6.0, particularly preferably 1.0:2.0 to 1.0:4.0.

Preferred flat and oval glass fibres have an average fibre height of 4 µm to 17 µm, more preferably of 6 µm to 12 µm and particularly preferably 6 µm to 8 µm and an average fibre width of 12 µm to 30 µm, more preferably 14 µm to 28 µm and particularly preferably 16 µm to 26 µm.

The glass fibres are preferably modified with a glass sizing agent on the surface of the glass fibre. Preferred glass sizing agents are epoxy-modified, polyurethane-modified and unmodified silane compounds and mixtures of the aforementioned silane compounds.

The glass fibres may also not be modified with a glass sizing agent.

It is a feature of the glass fibres used that the selection of the fibres is not limited by the interaction characteristics of the fibre with the polycarbonate matrix. An improvement in the properties of the compositions according to the invention is obtained not only for strong coupling to the polymer matrix but also for a non-coupling fibre.

Coupling of the glass fibres to the polymer matrix will be apparent from the low temperature fracture surfaces in scanning electron micrographs, in that most of the glass fibres which have broken will have broken at the same height as the matrix and there will only be isolated glass fibres protruding from the matrix. In the opposite case of non-coupling characteristics, what scanning electron micrographs show is that in low temperature fracture the glass fibres protrude markedly from the matrix or have completely slipped out therefrom.

Provided that glass fibres are present, the glass fibre content of composition is particularly preferably 10 to 20 wt %.

Carbon Fibres:

Carbon fibres are typically industrially manufactured from precursors such as, for example, acrylic fibres by pyrolysis (carbonization). A distinction is made between filament yarn (endless fibres) and short fibres.

The compositions according to the invention may employ endless fibres and short fibres. Preference is given to using short fibres.

The length of the chopped fibres is preferably between 3 mm and 125 mm. It is particularly preferable to employ fibres of 3 mm to 25 mm in length.

In addition to fibres of round cross section, fibres of cubic dimension (platelet shaped) are also useable. Suitable dimensions are for example 2 mm×4 mm×6 mm.

In addition to chopped fibres, it is alternatively preferable to employ ground carbon fibres. Preferred ground carbon fibres are of 50 µm to 150 µm in length.

Carbon fibres optionally have coatings of organic sizing agents in order to enable particular coupling bonds to the polymer matrix.

Short chopped fibres and ground carbon fibres are typically added to the polymeric base materials by compounding.

For long threads/endless threads special technical processes are typically used to arrange carbon in the form of very fine threads. These filaments are typically from 3 to 10 µm in diameter. The filaments can also be used to produce rovings, wovens, nonwovens, tapes, hoses or the like.

Provided that the compositions comprise carbon fibres the carbon fibre content is preferably 10 to 30 wt %, more preferably 10 to 25 wt %, yet more preferably 12 to 20 wt %.

Component C

The compositions according to the invention comprise as component C a mixture comprising at least one saturated or unsaturated monocarboxylic acid having a chain length of 6 to 30 carbon atoms and at least one ester of this monocarboxylic acid based on glycerol and/or diglycerol.

Isomers of diglycerol which form the basis of the monocarboxylic esters employed in accordance with the invention are the following:

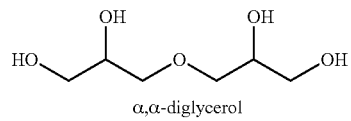

α,α-diglycerol

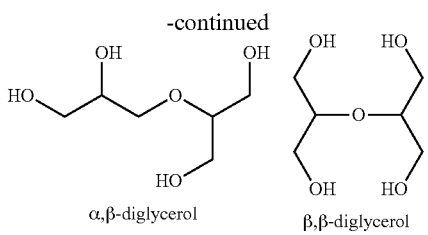

α,β-diglycerol   β,β-diglycerol

Mono- or polyesterified isomers of these formulae may be employed as the esters of diglycerol employed in accordance with the invention.

Mixtures comprising only one monocarboxylic acid and esters thereof or a mixture comprising two or more carboxylic acids and esters thereof may be employed.

Suitable monocarboxylic acids are for example caprylic acid ($C_7H_5COOH$, octanoic acid), capric acid ($C_9H_{19}COOH$, decanoic acid), lauric acid ($C_{11}H_{23}COOH$, dodecanoic acid), myristic acid ($C_{13}H_{27}COOH$, tetradecanoic acid), palmitic acid ($C_{15}H_{31}COOH$, hexadecanoic acid), margaric acid ($C_{16}H_{33}COOH$, heptadecanoic acid), oleic acid ($C_{17}H_{33}COOH$, cis-9-octadecenoic acid), stearic acid ($C_{17}H_{35}COOH$, octadecanoic acid), arachidic acid ($C_{19}H_{39}COOH$, eicosanoic acid), behenic acid ($C_{21}H_{43}COOH$, docosanoic acid), lignoceric acid ($C_{23}H_{47}COOH$, tetracosanoic acid), palmitoleic acid ($C_{15}H_{29}COOH$, (9Z)-hexadeca-9-enoic acid), petroselic acid ($C_{17}H_{33}COOH$, (6Z)-octadeca-6-enoic acid), (9Z)-octadeca-9-enoic acid), elaidic acid ($C_{17}H_{33}COOH$, (9E)-octadeca-9-enoic acid), linoleic acid ($C_{17}H_{31}COOH$, (9Z,12Z)-octadeca-9,12-dienoic acid), alpha- and gamma-linolenic acid ($C_{17}H_{29}COOH$, (9Z,12Z,15Z)-octadeca-9,12,15-trienoic acid and (6Z,9Z,12Z)-octadeca-6,9,12-trienoic acid), arachidonic acid ($C_{19}H_{31}COOH$, (5Z,8Z,11Z, 14Z)-eicosa-5,8,11,14-tetraenoic acid), timnodonic acid ($C_{19}H_{29}COOH$, (5Z,8Z,11Z,14Z,17Z)-eicosa-5,8,11,14,17-pentaenoic acid) and cervonic acid ($C_{21}H_{31}COOH$, (4Z,7Z, 10Z,13Z, 16Z, 19Z)-docosa-4,7,10,13,16,19-hexaenoic acid).

Preference is given to saturated aliphatic monocarboxylic acids having a chain length of 8 to 30 carbon atoms, particularly preferably having 12 to 24 carbon atoms and very particularly preferably having 14 to 24 carbon atoms.

Suitable as component C are in particular mixtures obtained by partial esterification of glycerol and/or diglycerol with a carboxylic acid mixture comprising two or more monocarboxylic acids having a chain length of 6 to 30 carbon atoms to afford an ester mixture. The carboxylic acid mixture preferably comprises oleic acid, particularly preferably also stearic acid and/or palmitic acid, Component C preferably comprises as the ester mixture monoesters and diesters of oleic acid, palmitic acid and/or stearic acid with glycerol and/or diglycerol and the carboxylic acid mixture, i.e. the corresponding carboxylic acids. Examples are glycerol monopalmitate, glycerol monooleate, diglycerol monopalmitate, diglycerol monooleate, diglycerol monostearate, diglycerol dipalmitate or diglycerol dioleate. The proportion of diesters of diglycerol is preferably smaller than the proportion of monoesters of diglycerol. Component C preferably also comprises free glycerol and/or diglycerol. However, component C may also be purified to the extent that no free glycerol and/or diglycerol remains present. Suitable mixtures are for example commercially available from Palsgaard® under the trade name Palsgaard® Polymers PGE 8100.

The OH numbers of these mixtures are preferably between 180 and 300 mg KOH/g (method 2011-0232602-92D, Currenta GmbH & Co. OHG, Leverkusen). The acid numbers of these mixtures are preferably between 1 and 6 mg KOH/g (method 2011-0527602-14D, Currenta GmbH & Co. OHG, Leverkusen). The iodine number of the mixtures according to Wijs is preferably between 40 and 80 g iodine/100 g (method 2201-0152902-95D, Currenta GmbH & Co. OHG, Leverkusen).

Particularly preferred as component B is a mixture having a content of free carboxylic acids summing to less than 3 wt % based on the total weight of mixture C, wherein oleic acid makes up the largest proportion. It is very particularly preferable when the content of oleic acid in the mixture is 1.5 to 2.5 wt %, in particular approximately 2 wt %, based on the total weight of mixture B. In this context "approximately" is to be understood as meaning a deviation of not more than 10%, preferably not more than 5%. It is very particularly preferable when oleic esters of glycerol and diglycerol from the main constituents of the ester proportions of component B. The proportion thereof sums to more than 50 wt % based on the total weight of mixture C.

The polycarbonate-containing compositions preferably comprise 0.05 to 10.0 wt %, more preferably 0.1 to 8.0 wt %, yet more preferably 0.2 to 6.0 wt %, of component C, yet more preferably 0.2 wt % to 2.0 wt %, more preferably 0.2 wt % to 1.8 wt %, very particularly preferably 0.20 to 1.0 wt %, of component C.

Component D

Preferably employed heat stabilizers are phosphorus compounds having the oxidation number +III, in particular phosphines and/or phosphites.

Preferentially suitable heat stabilizers are triphenylphosphine, tris(2,4-di-tert-butylphenyl) phosphite (Irgafos® 168), tetrakis(2,4-di-tert-butylphenyl)-[1,1-biphenyl]-4,4'-diyl bisphosphonite, octadecyl-3-(3,5-di-tert-butyl-4-hydroxyphenyl) propionate (Irganox® 1076), bis(2,4-dicumylphenyl)pentaerythritol diphosphite (Doverphos® S-9228), bis(2,6-di-tert-butyl-4-methylphenyl)pentaerythritol diphosphite (ADK STAB PEP-36). Said heat stabilizers are employed alone or in admixture (for example Irganox® B900 (mixture of Irgafos® 168 and Irganox® 1076 in a 1:3 ratio) or Doverphos® S-9228 with Irganox® B900/Irganox® 1076). The heat stabilizers are preferably employed in amounts of 0.003 to 1.0 wt %, more preferably 0.005 to 0.5 wt %, yet more preferably 0.01 to 0.2 wt %.

Component E

Optionally also present are up to 10.0 wt %, preferably 0.1 to 6.0 wt %, particularly preferably 0.1 to 3.0 wt %, very particularly preferably 0.2 to 1.0 wt %, in particular up to 0.5 wt %, of other customary additives ("further additives"). The group of further additives does not include heat stabilizers since these are described hereinabove as component D.

Such additives as are typically added in polycarbonates are in particular antioxidants, mould release agents, flame retardants. UV absorbers, IR absorbers, antistats, optical brighteners, light-scattering agents, colorants such as organic pigments, inorganic pigments, for example titanium dioxide, talc, silicates or quartz and/or additives for laser marking such as are described for example in EP-A 0 839 623, WO-A 96/15102, EP-A 0 500 496 or "Plastics Additives Handbook", Hans Zweifel, 5th Edition 2000, Hanser Verlag, Munich in amounts customary for polycarbonate. These additives may be added singly or else in admixture.

Preferred additives are specific UV stabilizers having as low a transmission as possible below 400 nm and as high a transmission as possible above 400 nm. Ultraviolet absorbers particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis(1,1-dimethylbenzyl)-2'-hydroxyphenyl)benzotriazole (Tinuvin® 234, BASF, Ludwigshafen), 2-(T-hydroxy-5'-(tert-octyl)phenyl)benzotriazole (Tinuvin® 329, BASF, Ludwigshafen), bis(3-(2H-benzotriazolyl)-2-hydroxy-5-tert-octyl)methane (Tinuvin® 360, BASF, Ludwigshafen), 2-(4,6-diphenyl-1,3,5-triazin-2-yl)-5-(hexyloxy)phenol (Tinuvin® 1577, BASF, Ludwigshafen), and also benzophenones such as 2,4-dihydroxybenzophenone (Chimassorb® 22, BASF, Ludwigshafen) and 2-hydroxy-4-(octyloxy)benzophenone (Chimassorb® 81, BASF, Ludwigshafen), 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (Tinuvin® 1600, BASF,Ludwigshafen), tetraethyl 2,2'-(1,4-phenylenedimethylidene)bismalonate (Hostavin® B-Cap, Clariant AG) or N-(2-ethoxyphenyl)-N'-(2-ethylphenyl)ethanediamide (Tinuvin® 312, CAS No. 23949-66-8, BASF, Ludwigshafen).

Particularly preferred specific UV stabilizers are Tinuvin® 360, Tinuvin® 329 and/or Tinuvin® 312, very particular preference being given to Tinuvin® 329 and Tinuvin® 312.

It is also possible to employ mixtures of these ultraviolet absorbers.

It is preferable when the composition comprises ultraviolet absorbers in an amount of up to 0.8 wt %, preferably 0.05 wt % to 0.5 wt %, more preferably 0.1 wt % to 0.4 wt %, based on the total composition.

The compositions according to the invention may also comprise phosphates or sulphonate esters as transesterification stabilizers. Triisooctyl phosphate is preferably present as a transesterification stabilizer. Triisooctyl phosphate is preferably employed in amounts of 0.003 wt % to 0.05 wt %, more preferably 0.005 wt % to 0.04 wt % and particularly preferably 0.01 wt % to 0.03 wt %.

The composition may be free from mould release agents, for example pentaerythritol tetrastearate or glycerol monostearate.

Compositions preferred in accordance with the invention comprise carbon black as an additive, particularly preferably 0.05 to 0.5 wt %, very particularly preferably up to 0.3 wt %.

It is particularly preferable when at least one heat stabilizer (component D) and optionally as a further additive (component E) a transesterification stabilizer, in particular triisooctyl phosphate, or a UV absorber are present.

Compositions according to the invention may also comprise an impact modifier as an additive (component E). Examples of impact modifiers are: acrylate core-shell systems or butadiene rubbers (Paraloid series from DOW Chemical Company); olefin-acrylate copolymers, for example Elvaloy® series from DuPont; silicone acrylate rubbers, for example Metablen® series from Mitsubishi Rayon Co., Ltd.

The production of the compositions according to the invention comprising components A to C and optionally D and/or E is effected by commonly used incorporation processes by combination, mixing and homogenization of the individual constituents, wherein in particular the homogenization preferably takes place in the melt under the influence of shear forces. Combination and mixing is optionally effected prior to melt homogenization using powder premixes.

It is also possible to use premixes of pellets, or of pellets and powders, with components B to E.

It is also possible to use premixes produced from solutions of the mixture components in suitable solvents where homogenization is optionally effected in solution and the solvent is then removed.

In particular, components B to E of the composition according to the invention may be introduced into the polycarbonate here by known processes or in the form of masterbatch.

Preference is given to the use of masterbatches to introduce components B to E, individually or in admixture.

In this context, the composition according to the invention can be combined, mixed, homogenized and subsequently extruded in customary apparatuses such as screw extruders (TSE twin-screw extruders for example), kneaders or Brabender or Banbury mills. The extrudate can be cooled and comminuted after extrusion. It is also possible to premix individual components and then to add the remaining starting materials singly and/or likewise mixed.

The combining and commixing of a premix in the melt may also be effected in the plasticizing unit of an injection moulding machine. In this case, the melt is directly converted into a moulded article in the subsequent step.

The compositions according to the invention can be processed in a customary manner in standard machines, for example in extruders or injection moulding machines, to give any moulded articles, for example films, sheets or bottles.

Production of the mouldings is preferably effected by injection moulding, extrusion or from solution in a casting process.

The compositions according to the invention are suitable for producing multilayered systems. This involves application of the polycarbonate-containing composition in one or more layer(s) onto a moulded article made of a plastics material. Application may be carried out at the same time as or immediately after the moulding of the moulded article, for example by film insert moulding, coextrusion or multicomponent injection moulding. However, application may also be to the ready-moulded main body, for example by lamination with a film, by encapsulative overmoulding of an existing moulded article or by coating from a solution.

The compositions according to the invention are suitable for producing components in the automotive sector, for instance for bezels, headlight covers or frames, lenses and collimators or light guides and for producing frame components in the electricals and electronics (EE) and IT sectors, in particular for applications subject to stringent flowability requirements (thin layer applications). Such applications include, for example, screens or housings, for instance for ultrabooks or frames for LED display technologies, e.g. OLED displays or LCD displays or else for E-ink devices. Further fields of application are housing parts of mobile communication terminals, such as smartphones, tablets, ultrabooks, notebooks or laptops, but also housing parts for satnavs, smartwatches or heart rate monitors, and also electrical applications in thin wall installations, for example residential and industrial networking units and smart meter housing components.

The moulded articles and extrudates made of the compositions according to the invention and also mouldings, extrudates and layers of multilayered systems comprising the compositions according to the invention likewise form part of the subject matter of this application.

It is a particular feature of the compositions according to the invention that they exhibit exceptional rheological and optical properties on account of the presence of component C. They are therefore particularly suitable for the production of sophisticated injection moulded parts, particularly for thin wall applications where good flowability is required. Examples of such applications are ultrabook housing parts, laptop covers, headlight covers, LED applications or components for electricals and electronics applications. Thin wall applications are preferably applications where wall thicknesses of less than approximately 3 mm, preferably of less than 3 mm, more preferably of less than 2.5 mm, yet more preferably of less than 2.0 mm, very particularly preferably of less than 1.5 mm, are present. In this context "approximately" is to be understood as meaning that the actual value does not deviate substantially from the recited value where a deviation of not more than 25%, preferably not more than 10%, is deemed as "not substantial".

The embodiments described hereinabove for the compositions according to the invention also apply—where applicable—to the use according to the invention.

The examples which follow are intended to illustrate the invention without, however, limiting said invention.

EXAMPLES

1. Description of Raw Materials and Test Methods

The polycarbonate-based compositions described in the following examples were produced by compounding on a Berstorff ZE 25 extruder at a throughput of 10 kg/h. The melt temperature was 275° C.

Component A-1: Linear polycarbonate based on bisphenol A having a melt volume flow rate MVR of 9.5 cm$^3$/(10 min) (as per ISO 1133:2012-03, at a test temperature of 300° C. and 1.2 kg loading).

Component A-2: Linear polycarbonate based on bisphenol A having a melt volume flow rate MVR of 6 cm$^3$/(10 min) (as per ISO 1133:2012-03, at a test temperature of 300° C. and 1.2 kg loading).

Components A-1 and A-2 each comprise 250 ppm of triphenylphosphine from BASF SE as component D-1.

Component A-3: Linear polycarbonate powder based on bisphenol A having a melt volume flow rate MVR of 6 cm$^3$/(10 min) (as per ISO 1133:2012-03, at a test temperature of 300° C. and 1.2 kg loading).

Component A-4: Linear polycarbonate based on bisphenol A having a melt volume flow rate MVR of 19 cm$^3$/(10 min) (as per ISO 1133:2012-03, at a test temperature of 300° C. and 1.2 kg loading).

Component A-5: Linear polycarbonate powder based on bisphenol A having a melt volume flow rate MVR of 19 cm$^3$/(10 min) (as per ISO 1133:2012-03, at a test temperature of 300° C. and 1.2 kg loading).

Component B-1: CS108F-14P, chopped short glass fibres (non-coupling) from 3B having an average fibre diameter of 14 μm and an average fibre length of 4.0 mm before compounding.

Component B-2: CS 7942, chopped short glass fibres (coupling) from Lanxess AG having an average fibre diameter of 14 μm and an average fibre length of 4.5 mm before compounding.

Component C: Mixture; Palsgaard® Polymers PGE 8100 from Palsgaard. This is a mixture comprising the esters glycerol monooleate (about 14 wt %), diglycerol monooleate (about 45 wt %), diglycerol dioleate (about 14 wt %). The amounts of free carboxylic acids in the mixture are about 2 wt % of oleic acid and less than 1 wt % of stearic acid and palmitic acid respectively.

Component E-1: triisooctyl phosphate (TOF) from Lanxess AG as transesteritication stabilizer.

Component E-2: Black Pearls 800 carbon black from Cabot Corporation.

Component E-3: Potassium perfluoro-1-butanesulphonate, commercially available as Bayowet® C4 from Lanxess, Leverkusen, Germany, CAS No. 29420-49-3.

Component E-4: Polytetrafluorethylene (Blendex® B449 (about 50 wt % PTFE and about 50 wt % SAN [80 wt % styrene and 20 wt % acrylonitrile] from Chemtura).

As a measure of heat resistance the Vicat softening temperature VST/B50 was determined according to ISO 306:2014-3 on 80 mm×10 mm×4 mm test specimens with a needle load of 50 N and a heating rate of 50° C./h or 120° C./h using a Coesfeld Eco 2920 instrument from Coesfeld Materialtest.

Melt volume flow rate (MVR) was determined according to ISO 1133:2012-03 (predominantly at a test temperature of 300° C., mass 1.2 kg) using a Zwick 4106 instrument from Zwick Roell. In addition MVR was measured after a preheating time of 20 minutes. This is a measure of melt stability under elevated thermal stress.

Charpy notched impact strength was measured at room temperature according to ISO 7391-2:2006 on single-side-injected test bars measuring 80 mm×10 mm×3 mm.

Charpy impact strength was measured at room temperature according to ISO 7391-2:2006 on single-side-injected test bars measuring 80 mm×10 mm×3 mm.

Shear viscosity (melt viscosity) was determined as per ISO 11443:2005 with a Göttfert Visco-Robo 45.00 instrument.

Tensile modulus of elasticiy was measured according to ISO 527-1/-2:1996-04 on single-side-injected dumbbells having a core measuring 80 mm×10×4 mm.

Breaking elongation—and likewise yield stress, yield elongation, tear strength—were determined by tensile testing according to DIN EN ISO 527-1/-2:1996.

Flammability of the samples investigated was also evaluated and classified, namely according to UL94. To this end test specimens measuring 125 mm×13 mm×d (mm) were produced, wherein the thickness d is the smallest wall thickness in the intended application. A V0 classification means that the flame self-extinguishes after not more than 10 seconds. No burning drips. Afterglow after second flaming has a duration of not more than 30 s.

The ball indentation temperature (BIT) was determined according to DIN EN 60695-10-2.

The sample sheets were in each case produced by injection moulding at the melt temperatures reported in the tables which follow.

2. Compositions

TABLE 1

Inventive compositions 2 to 4 and comparative example 1

|  |  | 1 (comparison) | 2 | 3 | 4 |
|---|---|---|---|---|---|
| Formulation |  |  |  |  |  |
| A-1 | wt % | 79.35 | 79.35 | 74.35 | 69.35 |
| A-2 | wt % | 3.65 | 3.65 | 3.65 | 3.65 |
| A-3 | wt % | 6.3 | 5.9 | 5.9 | 6.1 |
| C | wt % | — | 0.4 | 0.4 | 0.2 |

TABLE 1-continued

Inventive compositions 2 to 4 and comparative example 1

| | | 1 (comparison) | 2 | 3 | 4 |
|---|---|---|---|---|---|
| E-3 | wt % | 0.2 | 0.2 | 0.2 | 0.2 |
| E-4 | wt % | 0.5 | 0.5 | 0.5 | 0.5 |
| B-1 | wt % | 10 | 10 | 15 | 20 |
| Tests | | | | | |
| MVR | cm³/10 min | 4.9 | 9.6 | 8.8 | 5.8 |
| IMVR20' | cm³/10 min | 5.6 | 14.2 | 12.7 | 7.5 |
| Delta MVR/IMVR20' | | 0.7 | 4.6 | 3.9 | 1.7 |
| Melt viscosity at 280° C. | | | | | |
| eta 50 | Pa · s | 1272 | 911 | 1015 | 1330 |
| eta 100 | Pa · s | 1106 | 804 | 881 | 1127 |
| eta 200 | Pa · s | 964 | 698 | 757 | 954 |
| eta 500 | Pa · s | 728 | 549 | 591 | 703 |
| eta 1000 | Pa · s | 530 | 424 | 439 | 509 |
| eta 1500 | Pa · s | 424 | 344 | 361 | 410 |
| eta 5000 | Pa · s | 191 | 162 | 168 | 180 |
| Melt viscosity at 300° C. | | | | | |
| eta 50 | Pa · s | 708 | 474 | 540 | 676 |
| eta 100 | Pa · s | 629 | 407.0 | 486 | 599 |
| eta 200 | Pa · s | 556 | 365 | 419 | 499 |
| eta 500 | Pa · s | 446 | 314 | 343 | 403 |
| eta 1000 | Pa · s | 355 | 259 | 272 | 311 |
| eta 1500 | Pa · s | 298 | 226 | 233 | 268 |
| eta 5000 | Pa · s | 149 | 123 | 125 | 138 |
| Melt viscosity at 320° C. | | | | | |
| eta 50 | Pa · s | 443 | 282 | 356 | 460 |
| eta 100 | Pa · s | 389 | 245 | 288 | 353 |
| eta 200 | Pa · s | 326 | 219 | 234 | 295 |
| eta 500 | Pa · s | 272 | 176 | 189 | 247 |
| eta 1000 | Pa · s | 231 | 152 | 167 | 203 |
| eta 1500 | Pa · s | 199 | 141 | 150 | 178 |
| eta 5000 | Pa · s | 113 | 86 | 91 | 101 |

TABLE 1-continued

Inventive compositions 2 to 4 and comparative example 1

| | | 1 (comparison) | 2 | 3 | 4 |
|---|---|---|---|---|---|
| Vicat VST B50 | ° C. | 145.9 | 141.6 | 141.4 | 144.4 |
| BIT | ° C. | 139 | 134 | 134 | 137 |
| Mechanics | | | | | |
| Charpy impact strength ISO7391/179eU | kJ/m² | 206 s | 162 s | 127 s | 96 s |
| Tensile modulus of elasticity | N/mm² | 3795 | 3844 | 4746 | 5708 |
| Yield stress | N/mm² | 60 | 61 | 61 | 60 |
| Yield elongation | % | 4.6 | 4.7 | 4.3 | 3.9 |
| Tear strength | N/mm² | 44 | 45 | 45 | 49 |
| Breaking elongation | % | 23 | 17 | 12 | 7 |
| Flammability tests | | | | | |
| UL94 5 V in 3.0 mm | | | | | |
| Bar testing | | yes | yes | yes | yes |
| Sheet testing | | passed | passed | passed | passed |
| Classification | | 94-5VA | 94-5VA | 94-5VA | 94-5VA |
| UL94 5 V in 2.0 mm | | | | | |
| Bar testing | | yes | yes | yes | yes |
| Sheet testing | | failed | failed | failed | passed |
| Classification | | 94-5VB | 94-5VB | 94-5VB | 94-5VA |
| UL94V in 1.5 mm | | | | | |
| Overall assessment | | V0 | V0 | V0 | V0 |
| UL94V in 3.0 mm | | | | | |
| Overall assessment | | V0 | V0 | V0 | V0 |

Comparative example 1 which does not comprise component C has a markedly lower flowability than example 2. This is shown both in the MVR values and in the shear viscosities at different measured temperatures.

Examples 3 and 4 which comprise larger amounts of glass fibres, but which comprise component C, also show good flowabilities.

The very good flame retardancy properties are retained.

TABLE 2

Comparative examples 5 to 8 and inventive examples 9 to 16

| Formulation | | 5 (comparison) | 6 (comparison) | 7 (comparison) | 8 (comparison) | 9 | 10 | 11 | 12 | 13 | 14 | 15 | 16 |
|---|---|---|---|---|---|---|---|---|---|---|---|---|---|
| A-4 | wt % | 78 | 78 | 78 | 78 | 78 | 78 | 78 | 78 | 78 | 78 | 78 | 78 |
| A-5 | wt % | 6.99 | 6.83 | 6.99 | 6.83 | 6.59 | 6.43 | 6.59 | 6.43 | 6.39 | 6.23 | 6.39 | 6.23 |
| C | wt % | — | — | — | — | 0.4 | 0.4 | 0.4 | 0.4 | 0.6 | 0.6 | 0.6 | 0.6 |
| B-1 | wt % | 15 | 15 | — | — | 15 | 15 | — | — | 15 | 15 | — | — |
| B-2 | wt % | — | — | 15 | 15 | — | — | 15 | 15 | — | — | 15 | 15 |
| E-1 | wt % | 0.01 | 0.01 | 0.01 | 0.01 | 0.01 | 0.01 | 0.01 | 0.01 | 0.01 | 0.01 | 0.01 | 0.01 |
| E-2 | wt % | — | 0.16 | — | 0.16 | — | 0.16 | — | 0.16 | — | 0.16 | — | 0.16 |
| MVR | ml/(10 min) | 9.4 | 9.5 | 9.8 | 9.8 | 19.5 | 15.9 | 19.0 | 18.2 | 24.2 | 19.2 | 29.0 | 23.9 |
| IMVR20' | ml/(10 min) | 9.8 | 9.9 | 10.2 | 9.9 | 22.0 | 18.7 | 21.1 | 21.5 | 28.1 | 24.6 | 32.3 | 29.6 |
| Delta MVR/IMVR20' | | 0.4 | 0.4 | 0.4 | 0.1 | 2.5 | 2.8 | 2.1 | 3.3 | 3.9 | 5.4 | 3.3 | 5.7 |
| Vicat VSTB 50 | ° C. | 148.8 | 148.5 | 151.2 | 150.8 | 143.5 | 143.5 | 144.9 | 146.0 | 141.0 | 140.7 | 142.5 | 143.0 |
| Melt viscosity at 260° C. | | | | | | | | | | | | | |
| 50 | Pa · s | 1445 | 1585 | 1485 | 1585 | 1549 | 1458 | 1356 | 1302 | 1332 | 1355 | 1144 | 1186 |
| 100 | Pa · s | 1363 | 1448 | 1314 | 1386 | 1333 | 1286 | 1191 | 1161 | 1148 | 1183 | 990 | 1051 |
| 200 | Pa · s | 1187 | 1249 | 1136 | 1187 | 1126 | 1098 | 1026 | 1018 | 982 | 1016 | 848 | 910 |
| 500 | Pa · s | 880 | 913 | 826 | 867 | 825 | 804 | 749 | 759 | 737 | 743 | 630 | 695 |
| 1000 | Pa · s | 618 | 627 | 592 | 615 | 564 | 557 | 546 | 548 | 515 | 522 | 469 | 508 |
| 1500 | Pa · s | 477 | 4884 | 466 | 484 | 428 | 436 | 436 | 433 | 402 | 409 | 383 | 407 |
| 5000 | Pa · s | 200 | 205 | 200 | 202 | 182 | 185 | 175 | 185 | 180 | 179 | 163 | 173 |

TABLE 2-continued

Comparative examples 5 to 8 and inventive examples 9 to 16

| Formulation | | 5 (comparison) | 6 (comparison) | 7 (comparison) | 8 (comparison) | 9 | 10 | 11 | 12 | 13 | 14 | 15 | 16 |
|---|---|---|---|---|---|---|---|---|---|---|---|---|---|
| Melt viscosity 280° C. | | | | | | | | | | | | | |
| 50 | Pa · s | 852 | 840 | 776 | 776 | 646 | 676 | 646 | 646 | 661 | 617 | 550 | 617 |
| 100 | Pa · s | 745 | 746 | 654 | 695 | 610 | 629 | 569 | 584 | 583 | 584 | 497 | 554 |
| 200 | Pa · s | 665 | 661 | 593 | 613 | 539 | 570 | 495 | 512 | 519 | 523 | 433 | 491 |
| 500 | Pa · s | 530 | 531 | 476 | 497 | 437 | 460 | 407 | 419 | 419 | 431 | 355 | 396 |
| 1000 | Pa · s | 416 | 415 | 370 | 386 | 350 | 369 | 319 | 330 | 333 | 349 | 286 | 314 |
| 1500 | Pa · s | 339 | 336 | 310 | 323 | 291 | 304 | 270 | 277 | 280 | 289 | 241 | 263 |
| 5000 | Pa · s | 155 | 156 | 149 | 154 | 139 | 142 | 136 | 139 | 135 | 134 | 123 | 132 |
| Melt viscosity at 300° C. | | | | | | | | | | | | | |
| 50 | Pa · s | 442 | 421 | 417 | 415 | 345 | 390 | 319 | 294 | 375 | 299 | 223 | 356 |
| 100 | Pa · s | 400 | 395 | 373 | 381 | 325 | 357 | 282 | 275 | 331 | 288 | 215 | 324 |
| 200 | Pa · s | 355 | 362 | 340 | 348 | 310 | 324 | 248 | 284 | 282 | 282 | 199 | 275 |
| 500 | Pa · s | 303 | 308 | 291 | 296 | 271 | 271 | 212 | 242 | 239 | 244 | 170 | 219 |
| 1000 | Pa · s | 257 | 256 | 241 | 248 | 222 | 226 | 181 | 193 | 202 | 208 | 148 | 172 |
| 1500 | Pa · s | 218 | 222 | 209 | 214 | 187 | 197 | 160 | 174 | 174 | 180 | 133 | 154 |
| 5000 | Pa · s | 118 | 121 | 114 | 118 | 100 | 105 | 95 | 101 | 102 | 100 | 75 | 91 |
| Mechanic Properties | | | | | | | | | | | | | |
| Impact strength ISO7391/179eU 4 mm RT Tensile Test | kJ/m$^2$ | 110 s | 106 s | 55 s | 50 s | 92 s | 92 s | 42 s | 42 s | 83 s | 91 s | 39 s | 43 s |
| Yield stress | N/mm$^2$ | 62 | 62 | 90 | 89 | 65 | 64 | — | — | 66 | 65 | — | — |
| Yield elongation | % | 4.3 | 4.3 | 3.3 | 3.3 | 4.2 | 4 2 | — | — | 4.2 | 4.1 | — | — |
| Tear strength | N/mm$^2$ | 46 | 48 | 89 | 88 | 54 | 54 | 88 | 87 | 55 | 52 | 88 | 85 |
| Breaking elongation | % | 7.2 | 7.5 | 3.6 | 3.4 | 6 | 6.2 | 2.7 | 2.8 | 5.9 | 6.1 | 2.6 | 2.5 |
| Modulus of elasticity UL94V in 1.5 mm | N/mm$^2$ | 4889 | 4888 | 4902 | 4900 | 5010 | 4872 | 4995 | 4996 | 4913 | 4953 | 5082 | 4963 |
| Overall assessment | s | n.d. | n.d. | V2 | V2 | V2 | n.d. | n.d. | V2 | n.d. | n.d. | n.d. | V2 |

The comparative examples 5 to 8 which do not comprise component C exhibit markedly poorer flowabilities than the respective corresponding examples (with component C). Addition of triisooctyl phosphate (component E-1) is shown to further enhance flowability.

The mechanical properties of inventive examples 9 to 16 remain largely unchanged. This is also the case for the flame retardancy properties.

The invention claimed is:

1. A composition comprising
A) 20.0 wt % to 99.45 wt % of aromatic polycarbonate,
B) 0.50 to 50.0 wt % of glass fibres or carbon fibres,
C) 0.05 wt % to 10.0 wt % of a mixture comprising at least one saturated or unsaturated monocarboxylic acid having a chain length of 6 to 30 carbon atoms and at least one ester of this monocarboxylic acid based on glycerol and/or diglycerol, wherein the mixture comprises oleic acid and the ester is at least one ester of oleic acid based on glycerol and/or diglycerol.

2. The composition according to claim 1, wherein the composition comprises
A) 70.0 to 94.0 wt % of aromatic polycarbonate,
B) 5 to 25 wt % of glass fibres or carbon fibres,
C) 0.2 to 6.0 wt % of the mixture comprising at least one saturated or unsaturated monocarboxylic acid having a chain length of 6 to 30 carbon atoms and at least one ester of the monocarboxylic acid based on glycerol and/or diglycerol
D) 0.005 to 0.5 wt % of heat stabilizer and
E) 0.1 to 3 wt % of further additives.

3. The composition according to claim 1, wherein component
A) is 79.0 to 89.5 wt % of aromatic polycarbonate and
B) is 10 to 20 wt % of glass fibres.

4. The composition according to claim 1, wherein the composition comprises as component C) 0.2 to 1.0 wt % of the mixture.

5. The composition according to claim 1, wherein component C comprises more than 50 wt % of oleic esters of glycerol and/or diglycerol based on the total weight of component C and less than 3 wt % of free carboxylic acids based on the total weight of component C).

6. The composition according to claim 1, wherein oleic acid makes up the largest proportion of free carboxylic acids.

7. The composition according to claim 1, wherein component C comprises a carboxylic acid mixture comprising two or more monocarboxylic acids having a chain length of 6 to 30 carbon atoms and an ester mixture composed of esters of glycerol and diglycerol of these monocarboxylic acids.

8. The composition according to claim 1, wherein the composition comprises the heat stabilizer triisooctyl phosphate.

9. The composition according to claim 1, wherein the composition comprises carbon black.

10. Mouldings, extrudates or layer of a multilayered system made of the composition according to claim 1.

11. The moulding according to claim 10, having a wall thickness of less than 3 mm.

12. The moulding according to claim 11, wherein the moulding is a housing part of a smartphone, smart meter, tablet, notebook or laptop.

13. A composition consisting of
A) 79 wt % to 90 wt % of aromatic polycarbonate,
B) 8.5 to 20.5 wt % of glass fibres or carbon fibres,
C) 0.2 to 1.0 wt % of a mixture comprising at least one saturated or unsaturated monocarboxylic acid having a chain length of 6 to 30 carbon atoms and at least one ester of the monocarboxylic acid based on glycerol and/or diglycerol,
D) 0.005 to 0.5 wt % of heat stabilizer and
E) 0.1 to 3 wt % of further additives.

\* \* \* \* \*